United States Patent [19]

Rotella

[11] Patent Number: 4,677,933
[45] Date of Patent: Jul. 7, 1987

[54] STOCK PRICE TRACKING APPARATUS

[76] Inventor: Thomas B. Rotella, 22 E. 7th St., Clifton, N.J. 07011

[21] Appl. No.: 801,064

[22] Filed: Nov. 22, 1985

[51] Int. Cl.⁴ .................. G09B 19/18; G09F 9/00
[52] U.S. Cl. .................. 116/313; 116/222; 116/306; 116/316; 283/1 R; 283/48 R; 434/107
[58] Field of Search .................. 116/215, 222–225, 116/311–332, DIG. 1, DIG. 3, DIG. 6, DIG. 23, DIG. 37, 303, 305, 306, 309; 235/90, 123, 127; 434/107, 194; 368/93, 223; 283/1 R, 48 R; 273/1 GF, 256, 278, DIG. 26; 446/168–170, 172

[56] References Cited

U.S. PATENT DOCUMENTS

| | | | |
|---|---|---|---|
| 1,405,793 | 2/1922 | Marshall | 116/325 |
| 2,299,284 | 10/1942 | Steidemann | 116/324 |
| 2,409,028 | 10/1946 | Filbrun | 446/168 |
| 2,411,300 | 11/1946 | Southwell | 116/324 |
| 2,923,122 | 2/1960 | Inman | 368/12 |
| 2,950,365 | 8/1960 | Bolstad | 116/215 |
| 3,481,330 | 12/1969 | Belina | 434/218 |
| 3,599,598 | 8/1971 | Banner | 116/329 |
| 3,800,443 | 4/1974 | O'Connell et al. | 434/184 |

FOREIGN PATENT DOCUMENTS 2344903 10/1977 France .................. 116/323

Primary Examiner—Charles Frankfort
Assistant Examiner—W. Morris Worth
Attorney, Agent, or Firm—Richard M. Goldberg

[57] ABSTRACT

Stock price tracking apparatus includes a base having at least one side; a chart removably mounted on each side and each chart including a first scale and a second scale; a lever associated with each side for monitoring a stock price to determine when to sell or retain a stock, each lever removably and pivotally mounted on the respective side along the first scale at a selected position corresponding to a stop loss setting, each lever including a pointer for pointing to a second stock price along the second scale as the lever is pivoted on the base about the selected position, and a channel extending along each lever; a retaining spring for releasably retaining each lever in a selected pivoted position; and a ball movable in each channel between a first position when the second stock price is above the stop loss setting and a second position when the second stock price is not greater than the stop loss setting for indicating when to sell or retain the stock.

22 Claims, 14 Drawing Figures

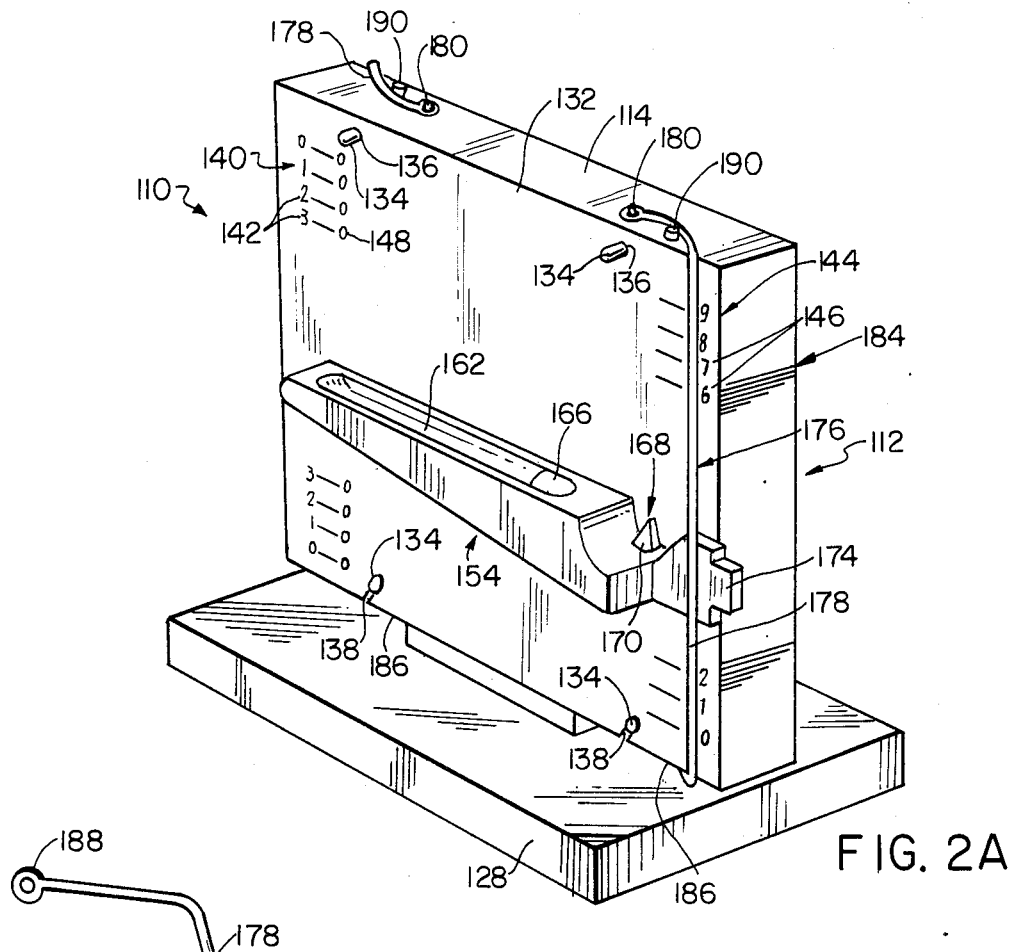
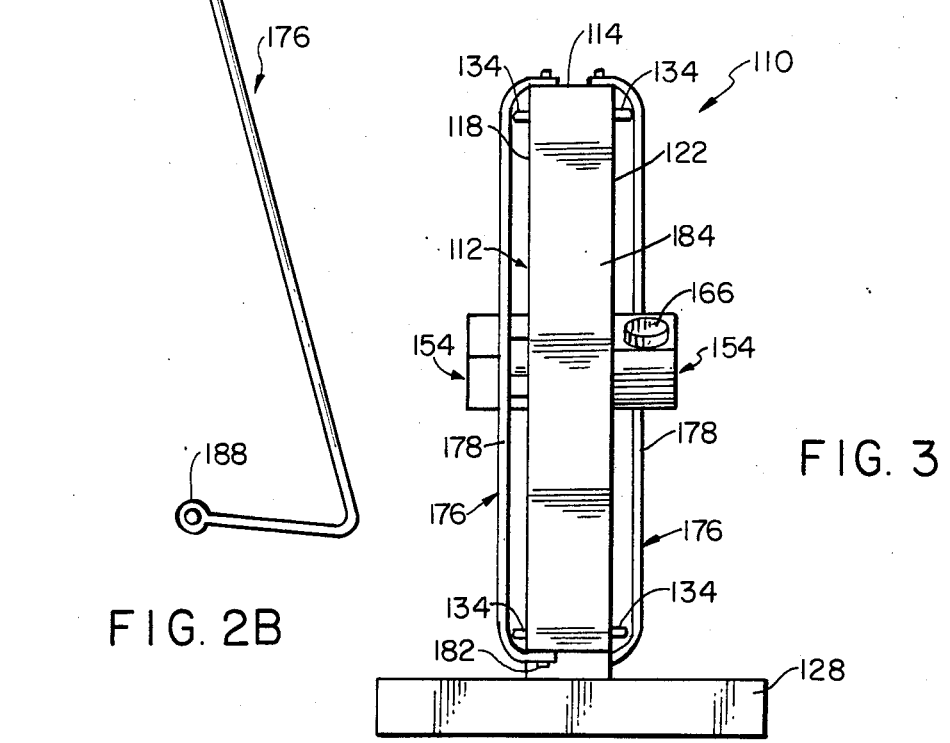
FIG. 2A
FIG. 2B
FIG. 3

STOCK PRICE TRACKING APPARATUS

BACKGROUND OF THE INVENTION

This invention relates generally to stock price tracking apparatus and, more particularly, is directed to a stop loss annunciator for tracking a plurality of stop loss orders.

Investors in the stock market must continuously be aware of the price of their stocks in order to determine what further action to take, that is, whether to buy, sell or hold onto the stocks. In this regard, investors commonly use stop loss orders. A stop loss order is an order given to the broker to sell the stock at the market price if the stock price drops to a certain predetermined level. For example, a common indicator for a stop loss order is 10% of the then selling or market price, that is, if the stock price drops 10%, the broker has a standing order to sell the stock at the then market price.

As such, stop loss orders act as a safety net so that the investor can avoid major losses and also prevent complete devastation, particularly in the case of margin accounts. In a sense, stop loss orders are insurance that the stock price will not drop any further than a predetermined price.

However, for an investor with a large stock portfolio, it becomes difficult to keep track of a plurality of stop loss orders.

OBJECTS AND SUMMARY OF THE INVENTION

Accordingly, it is an object of the present invention to provide stock price tracking apparatus that permits easy setting and tracking of stop loss orders for a multitude of stocks.

It is another object of the present invention to provide stock price tracking apparatus in which mental stop loss prices can be monitored, rather than placing rigid stop loss orders with the broker and then having to change them from time to time, to the annoyance of the broker.

It is still another object of the present invention to provide stock price tracking apparatus having much greater flexibility in monitoring stop loss orders than can be achieved by placing an advanced, fixed stop loss order with a broker.

In accordance with an aspect of the present invention, stock price tracking apparatus includes a base; a first scale on the base; a second scale on the base; lever means for monitoring a stock price to determine when to buy, sell or retain a stock, the lever means removably and pivotally mounted on the base along the first scale at a selected position corresponding to a first stock price, the lever means including pointer means for pointing to a second stock price along the second scale as the lever means is pivoted on the base about the selected position, and a channel extending along the lever means; and ball means movable in the channel between a first position and a second position in correspondence with the pivoted position of the lever means for indicating when to buy, sell or retain the stock.

The above and other, objects, features and advantages of the present invention will become readily apparent from the following detailed description which is to be read in connection with the accompanying drawings.

BRIEF DESCRIPTION OF THE DRAWINGS

FIG. 2A is a perspective view of a stop loss annunciator according to another embodiment of the present invention;

FIG. 2B is a perspective view of the retaining means of the stop loss annunciator of FIG. 2A;

FIG. 3 is a side elevational view of the stop loss annunciator of FIG. 2A;

DETAILED DESCRIPTION OF THE PREFERRED EMBODIMENTS

Figure 1:
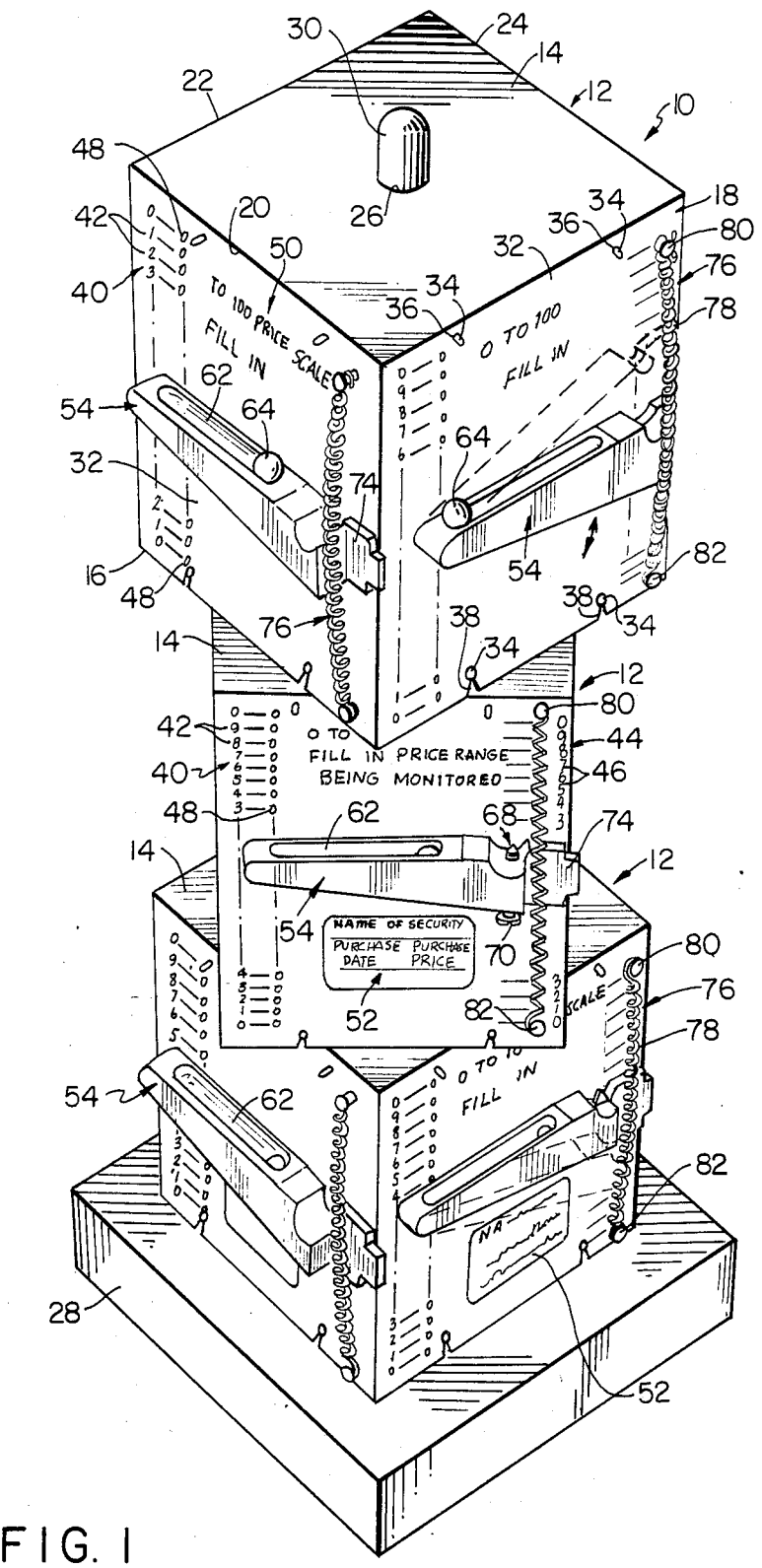
FIG. 1 is a perspective view of a stop loss annunciator according to one embodiment of the present invention.

Referring to the drawings in detail, and initially to FIG. 1 thereof, a stock price annunciator 10 according to a first embodiment of the present invention includes a base cube 12 having a top 14, a bottom 16 and four sides 18, 20, 22 and 24. Base cube 12 may be made of any suitable material, such as plastic, wood or the like, and is preferably hollow to reduce the weight and amount of material. As shown, top 14 includes a central opening 26 and, although not shown, bottom 16 also includes a central opening. In this manner, a plurality of base cubes 12 can be stacked on a support platform 28 through an upstanding support shaft 30 mounted on platform 28. With this arrangement, each base cube 12 can be rotated about the axis of support shaft 30 for easy viewing of any side 18, 20, 22 or 24 of any cube 12. Although only three base cubes 12 are shown, it will be appreciated that any desired number of base cubes 12 can be provided by merely extending the height of support shaft 30.

Each side 18, 20, 22 and 24 includes means for securing a chart 32 thereon. For example, such means may take the form of four pins 34 extending from each side of base cube 12, two pins 34 being spaced from each other at the upper end of each side and two pins 34 spaced from each other at the lower end of each side. The pins 34 at the lower end of each side may have enlarged heads, much like nails, the reason for which will be apparent from the discussion which follows.

Chart 32 may be in the form of a flat sheet of preprinted paper having two apertures 36 at the upper end thereof through which pins 34 at the upper end of the respective side extend. The lower part of chart 32 includes two spaced lead-in channels 38 through which pins 34 at the lower end of the respective side extend, whereby chart 32 can be removably secured to a respective side 18, 20, 22 or 24.

As shown, each chart 32 includes a first columnar scale 40 extending along the left edge thereof and having a plurality of numbers 42 extending in ascending order from the lower edge to the upper edge of chart 32. Chart 32 also includes a second columnar scale 44 extending along the right edge thereof and having a plurality of numbers 46 extending in ascending order from the lower edge to the upper edge of chart 32. Scales 40 and 44 correspond to stock prices and are preferably identical to each other. The scales can be made to correspond to any range of stock prices by only including unit digits 0-9 in each scale, as shown. Thus, tens and hundreds digits, if applicable, can be added by the user, in accordance with the range of stock prices to be covered by scales 40 and 44. As shown, scale 40 includes a circle 48 adjacent each number 42, the reason for which will become apparent from the discussion which follows. Each chart 32 may also include various indicia, for example, instructions 50 on how to fill in chart 32, and a blank area 52 for filling in such information as the name of the stock, the purchase date and the purchase price. However, any suitable modification of charts 32 can be made, as long as there are two scales 40 and 44.

Figure 8:
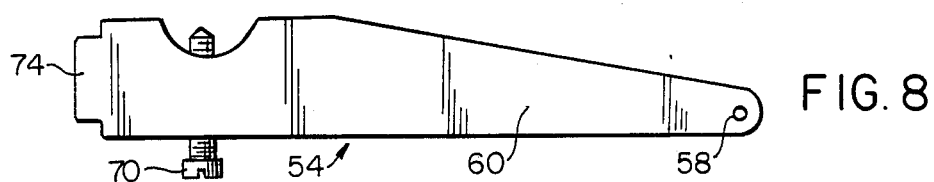
FIG. 8 is a front elevational view of the lever of FIG. 5.
Figure 7:
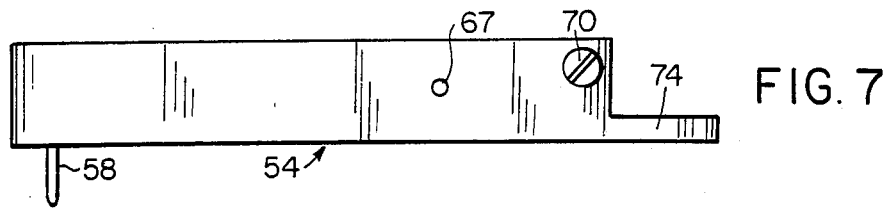
FIG. 7 is a bottom plan view of the lever of FIG. 5.

Referring now to FIGS. 1 and 5-8, stock price annunciator 10 further includes a lever 54 associated with each side 18, 20, 22 and 24, each lever 54 being identical to any other lever 54. Accordingly, only one such lever 54 will be described. Lever 54 preferably has a wedge-shaped configuration, as shown in the rear plan view of FIG. 8, and includes a pivot pin 58 extending from the rear face 60 at the narrow end of wedge-shaped lever 54, as shown in FIG. 8. In accordance with the present invention, pivot pin 58 is removably fit through a circle 48 on chart 32 into a respective side of base cube 12. In this regard, sides 18, 20, 22 and 24 of base cube 12 are made of a material that permits insertion and removal of pivot pin 58 therefrom. Alternatively, each of sides 18, 20, 22 and 24 may include a plurality of apertures (not shown) in line with circles 48 when a chart 32 is positioned thereover for receiving pivot pin 58, whereby pivot pin 58 can be easily inserted and removed from each aperture. It is only important that pivot pin 58 can be selectively inserted and removed from a side of base cube 12, and pivotally secured in a selected aperture in the respective side.

As shown more clearly in FIGS. 5-8, lever 54 includes an elongated channel 62 extending in the lengthwise direction on the upper surface thereof. As will be discussed in greater detail hereinafter, channel 62 carries a ball 64, which can roll from one end of channel 62 to the other end thereof, depending on the angle of inclination of lever 54. A pocket or depression 66 is formed in channel 62 adjacent the free end of lever 54 so as to capture ball 64 when lever 54 is downwardly inclined. In this manner, pocket 66 prevents ball 64 from rolling back. A through bore 67 extends through lever 54 and, in particular, through pocket 66. In this regard, when ball 64 rolls into pocket 66, a pin or the like (not shown) can be inserted through bore 67 to remove ball 64 from pocket 66.

Figure 12:
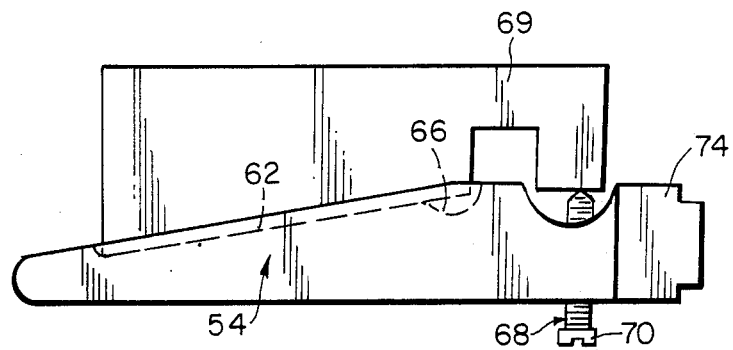
FIG. 12 is a front elevational view of a pointer setting device, shown with the lever of FIG. 5.

A pointer 68 is formed at the free end of lever 54. In the embodiment shown in FIGS. 5-8, pointer 68 takes the form of a screw or bolt 70 screw threadedly received in a vertically oriented aperture 72 formed at the free end of lever 54. As lever 54 is pivoted about pivot pin 58, pointer 68 will be associated with the numbers 46 of second scale 44. In accordance with the present invention, pointer 68 is set so that lever 54 is tilted slightly in the downward direction when pointer 68 points to a number 46 which is identical to the number 42 at which lever 54 is pivoted. In this regard, a pointer setting device 69 which can be constructed from cardboard, plastic or any other suitable material, can be provided in the configuration shown in FIG. 12, for easily adjusting pointer 68 by appropriately turning screw or bolt 70.

In addition, as shown, lever 54 includes a gripping tab 74 at the free end thereof by which a user can grip and thereby pivot lever 54 to any desired position. Preferably, gripping tab 74 is narrower than the remainder of lever 54, as shown, the reason for which will become apparent from the description which follows.

Referring back to FIG. 1, retaining means 76 is provided for retaining lever 54 in a desired pivoted position. In the embodiment of FIG. 1, retaining means 76 includes a coil spring 78, a first end of which is secured to a first post 80 at the upper end of the respective side 18, 20, 22 or 24 along the right edge thereof and a second end of which is secured to a second post 82 at the lower end of the respective side 18, 20, 22 or 24 along the right edge thereof. First and second posts 80 and 82 are preferably removably secured within apertures (not shown) in the respective side to permit different charts 32 to be removed and added to the side. Alternatively, each chart 32 may include a lead-in channel, much like lead-in channels 38, by which the charts can be inserted over and removed from posts 80 and 82. Coil spring 78 is stretched between posts 80 and 82 and exerts a restraining force on gripping tab 74 of lever 54, whereby lever 54 can be pivoted by moving gripping tab 74 to a desired position against the restraining force of coil spring 78. However, once such external pivoting force is removed, coil spring 78 maintains lever 54 in the pivoted position.

In operation, the user first adds the appropriate tens and hundreds digits, if applicable, to scales 40 and 44 of each chart 32 in accordance with the range of stock prices to be used. Generally, a range is provided in which the purchase price of the stock is substantially centrally located along scales 40 and 44. The user then secures charts 32 to each side 18, 20, 22 and 24 of base cube 12. This is accomplished by removing lever 54, coil spring 78 and posts 80 and 82 from each side. However, coil spring 78 and posts 80 and 82 can remain in the respective side during such change if the charts have their bottom and top right edges chamferred.

In accordance with the present invention, wherein stop loss orders are continuously and easily monitored, the user inserts the pivot pin 58 of each lever 54 into a respective side 18, 20, 22 or 24 and through a circle 48 corresponding to a number 42 of scale 40 which is, for example, 10% less than the then selling or market price of the stock. This number 42 represents the stop loss price at which the stock is to be sold. It will be appreciated that any other suitable spread, such as 5%, 8% or the like, may be used for setting the stop loss order settings, depending on the price of the stocks. Posts 80 and 82 and coil spring 78 are then inserted into each side of base cube 12, as shown in FIG. 1. Then, each lever 54 is pivoted upwardly to a position at which pointer 68 points to the current price of the stock, as shown in dashed lines in the uppermost base cube 12 of FIG. 1. In this position, the ball 64 in each channel 62 rolls toward the left or pivoted end of the respective lever 54.

If the price of the stock drops, the respective lever 54 is pivotally lowered in accordance with such drop in price. Coil spring 78 maintains lever 54 in each pivoted position. If the price of the stock drops to a value which represents a 10% or greater drop, lever 54 is pivoted to a position which is below level. As a result, ball 64 therein rolls into pocket 66 to indicate such price drop. This is an indication to the investor that he should contact his broker to place a sell order. In this manner, a user can readily keep track of a plurality of stop loss orders, and determine when to sell the stock. If the price of the stock does not drop at all, or drops to a value which represents a less than 10% drop, ball 64 does not roll into pocket 66, thereby providing an indication to the investor that he should retain the stock. Further, mental stop loss prices can be monitored, rather than placing rigid stop loss orders with the broker and then having to change them from time to time, to the annoyance of the broker. The present invention therefore provides much greater flexibility in monitoring stop loss orders than can be achieved by placing an advanced fixed stop loss order with a broker.

Of course, if the price of the stock increases too much, the stop loss order is changed. In such case, pivot pin 58 is removed from the circle 48 it then occupies, and is inserted within the respective side through another circle 48 which corresponds to a number 44 of greater value. In other words, the stop loss order is raised. For example, when the price of the stock reaches a value 10% greater than the then previous market price, the stop loss order is raised to a value equal to the previous market price, and the lever 54 is pivoted to a position where pointer 68 points to the current market price. Then, if the stock falls to the previous market price, the stock is sold. The stop loss setting of pivot pin 58 is periodically changed as the stock increases in price.

Figure 13:
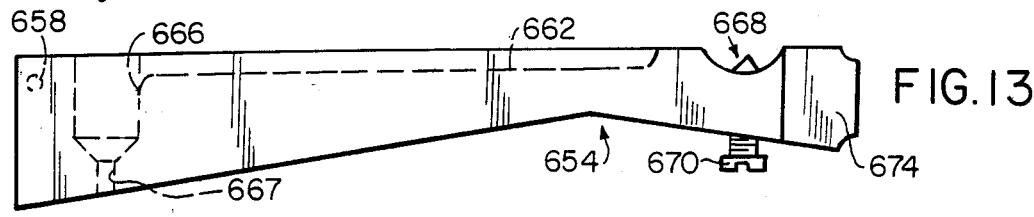
FIG. 13 is a front elevational view of yet another embodiment of a lever according to the present invention.

The present invention can also be used for monitoring stocks to determine when to buy a stock, as indicated by lever 654 in FIG. 13. In such case, lever 654 includes a pocket 666 on the left side of channel 662, with the ball rolling from right to left. Thus, pointer 668 would be set to a price which is 10% less than the then expected price at which lever 654 would be pivoted. When the price of the stock rises by 10%, the ball would roll from right to left to indicate an opportunity where an investor should buy a stock before it rises any further (that is, to indicate a time when a security is breaking out on the upside), to indicate a buy stop loss order, or to cover a "short" position.

Use of the present invention is not limited to stocks, but can also be used with respect to option trading and in future trading.

Referring now to FIGS. 2A, 2B and 3, there is shown a stop loss annunciator 110 according to another embodiment of the present invention, in which like parts are represented by like numerals augmented by 100, and a detailed description thereof will not be given for the sake of brevity. Specifically, a base stand 112 is provided in place of base cube 12. Base stand 112 includes a support platform 128 and a support panel 184 secured to support platform 128 in an upstanding position. As shown, support panel 184 includes two opposite sides 118 and 122 which include pins 134 at the upper and lower ends thereof for supporting respective charts 132 in the same manner as pins 34 of FIG. 1. Further, the lower end of support panel 184 is cut away at the edges thereof, as shown in FIGS. 2A and 3, to define undercut sections 186. Chart 132 is constructed in a substantially identical manner to chart 32 of FIG. 1.

Lever 154 is constructed in an identical manner to lever 54 of FIG. 1, with the exception that pointer 68 is formed as a triangular section 170 fixedly secured to lever 154, rather than the adjustable screw or bolt 70 of FIG. 1.

Further, retaining means 176 includes a wire rod 178 bent in a U-shape, as shown in FIG. 2B, and includes two eyes 188 at opposite ends thereof. Eyes 188 are secured to posts 180 at the top 114 of support panel 184 and to posts 182 at undercut sections 186 of support panel 184, whereby wire rod 178 extends over gripping tab 174. Biasing pins 190 are also secured to top 114 and undercut sections 186, around which wire rod 178 travels. In this regard, biasing pins 190 are positioned so as to provide a biasing force to wire rod 178, whereby wire rod 178 applies a restraining force to gripping tab 174, and thereby functions in an identical manner to coil spring 78 of FIG. 1.

Figure 4:
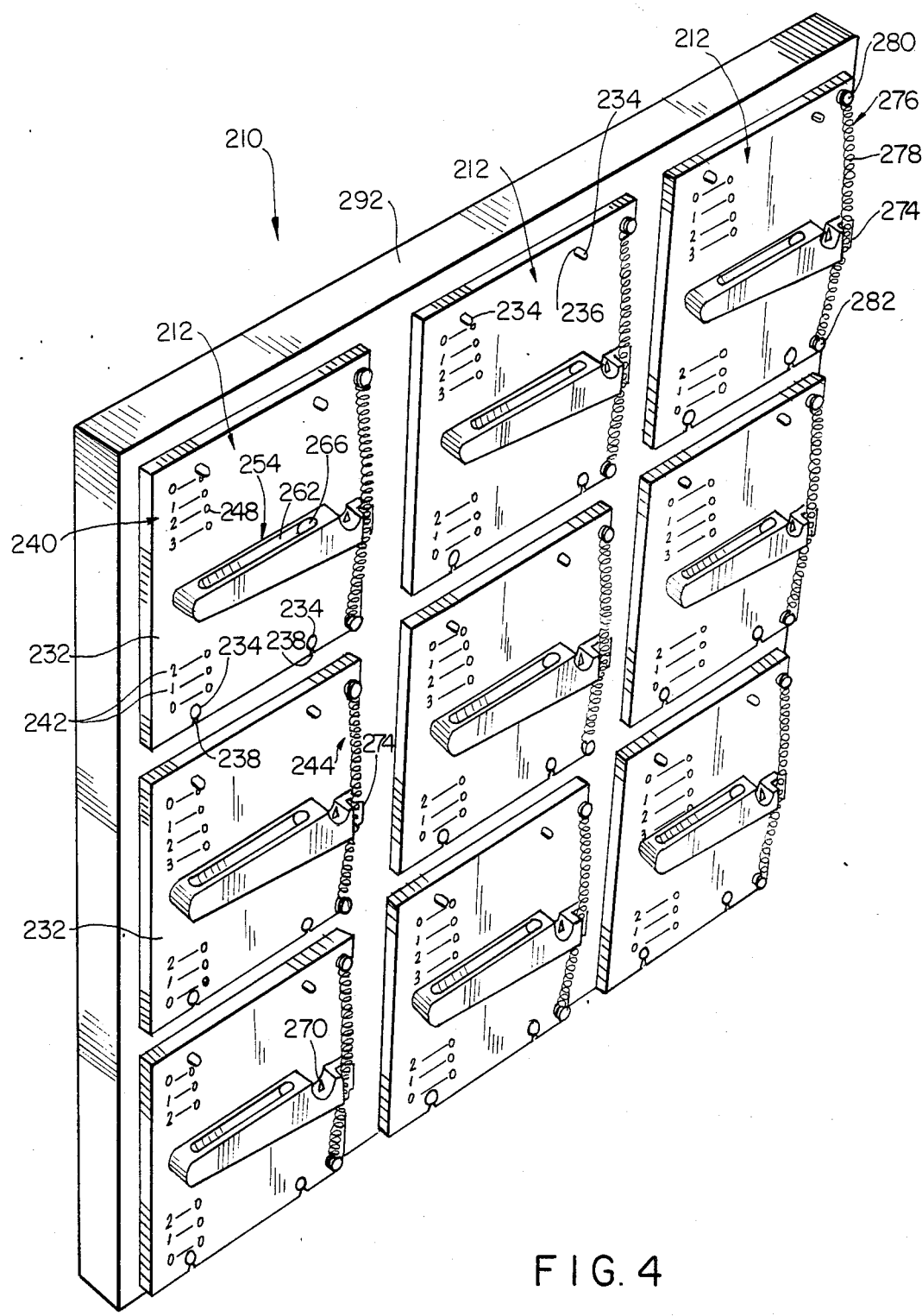
FIG. 4 is a perspective view of a stop loss annunciator according to still another embodiment of the present invention.
Figure 5:
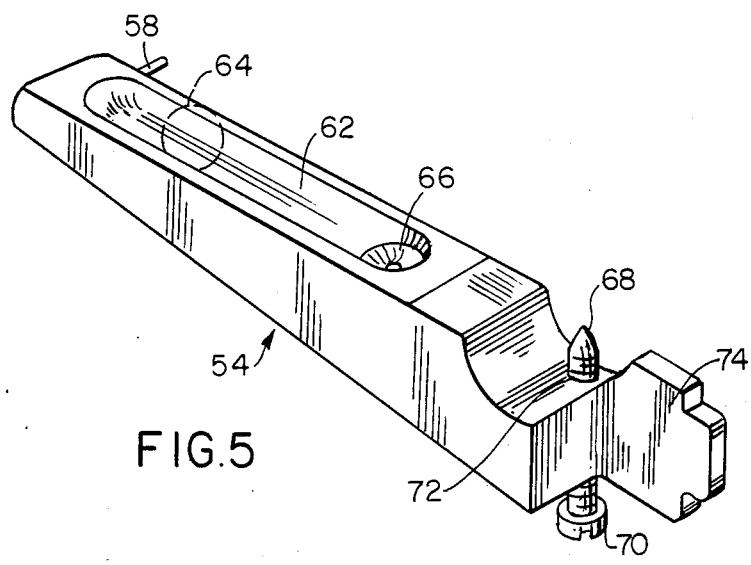
FIG. 5 is a perspective view of one embodiment of a lever for use with the stop loss annunciator according to the present invention.
Figure 6:
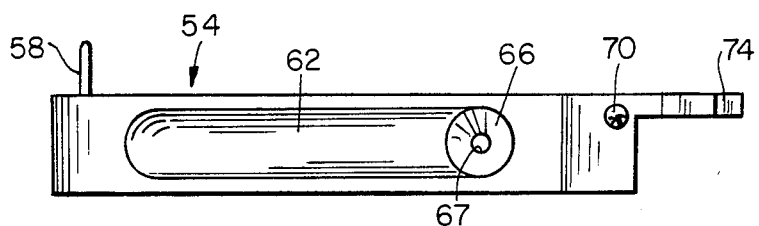
FIG. 6 is a top plan view of the lever of FIG. 5.

Referring now to FIG. 4, there is shown another embodiment of the present invention, in which like elements similar to those in FIG. 1 are represented by the same numerals augmented by 200, and a detailed description thereof will be omitted herein for the sake of brevity. As shown, stock price annunciator 210 of FIG. 4 differs from the previously discussed embodiments by the use of a plurality of flat display bases or plaques 212 which are mounted on a common wall 292. In this regard, a user can monitor any number of stocks at a single glance.

Figure 9:
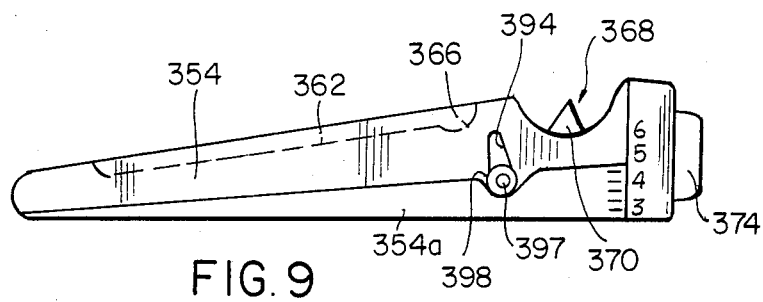
FIG. 9 is a front elevational view of another embodiment of a lever for use with the stop loss annunciator according to the present invention.
Figure 10:
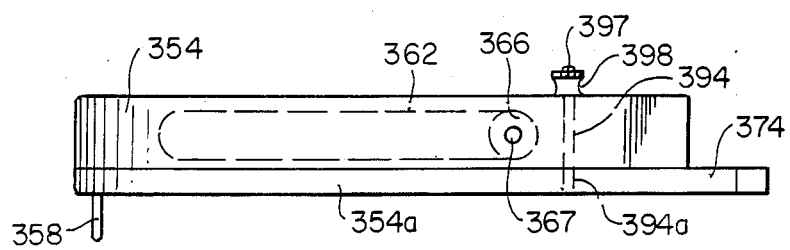
FIG. 10 is a bottom plan view of the lever of FIG. 9.

Referring now to FIGS. 9 and 10, there is shown another embodiment of a lever according to the present invention, in which like elements similar to those in FIGS. 5-8 are represented by the same numerals augmented by 300, and a detailed description of such like elements will be omitted herein for the sake of brevity. As shown, lever 354 is of an adjustable spread type and, in this regard, includes an elongated, substantially vertically oriented slot 394 extending therethrough. A lever extension 354a is pivotally mounted with respect to lever 354 about pivot pin 358, and is positioned behind lever 354, as shown in FIG. 10. Lever extension 354a includes a similar elongated, substantially vertically oriented slot 394a in coincidence with slot 394 of lever 354. A fastening device 396 in the form of a bolt 397 extending through slots 394 and 394a, and a nut 398 secured to the end of bolt 397, serves to secure lever 354 and lever extension 354a together, that is, to prevent pivoting movement of lever extension 354a with respect to lever 354. In this regard, lever extension 354a can be pivoted with respect to lever 354 and secured at different desired positions to accommodate different spreads in stock prices on the charts. Accordingly, the bottom of lever 354 can be made to appear parallel to horizontal when a stop loss price is achieved, regardless of the spread in stock prices on charts 32. In a sense, the fan-like arrangement of lever 354 functions as a visual aid to the user.

Figure 11:
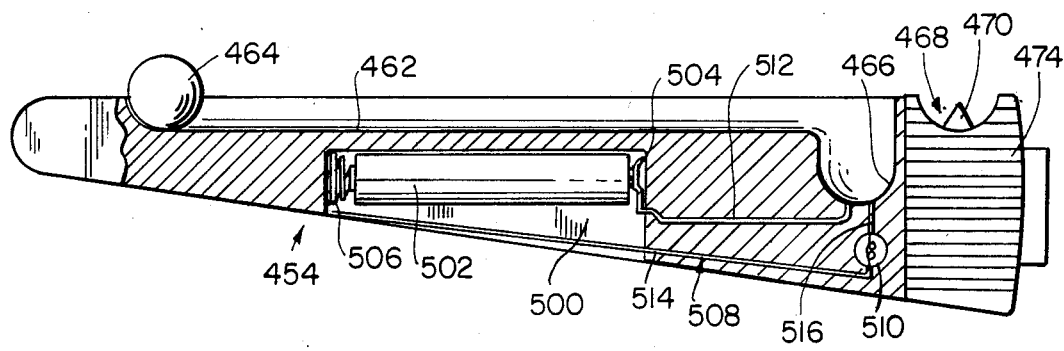
FIG. 11 is a partial cross-sectional view of still another embodiment of a lever for use with the stop loss annunciator according to the present invention.

Referring now to FIG. 11, there is shown another embodiment of a lever according to the present invention, in which like elements similar to those in FIGS. 5-8 are represented by the same numerals augmented by 400, and a detailed description of such like elements will be omitted herein for the sake of brevity. As shown, lever 454 includes an internal cavity 500 which contains a battery 502 and terminal ends 504 and 506 which hold battery 502 in the position shown and electrically connect battery 502 to a circuit 508 which will now be described.

Circuit 508 includes an alarm device 510 which may take any suitable form. For example, as shown, alarm device 510 is a lamp which is visible through an aperture (not shown) at the front of lever 454. Any other suitable alarm device, such as a bell, buzzer or the like may be substituted for the lamp. Circuit 508 further includes conducting wires 512 and 514 which are electrically connected at one end thereof to terminal ends 504 and 506, respectively. The opposite end of wire 512 extends to the surface of pocket 466, while the opposite end of wire 514 is connected to alarm device 510. A separate wire 516 is connected between alarm device 510 and the surface of pocket 466 in spaced relation to the opposite end of wire 512. With this embodiment, ball 464 is made of a conducting metal material.

In operation, when lever 454 is pivoted downwardly to the stop loss setting, ball 464 rolls in channel 462 into pocket 466. At this time, ball 464 closes circuit 508, whereby current is supplied from battery 502 to alarm device 510, and the lamp lights to indicate to the user that a stop loss setting has been reached.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope and spirit of the invention as defined by the appended claims.

What is claimed is:

1. Stock price tracking apparatus, comprising:
    a base;
    a first scale on said base;
    lever means releaseably retainable in a selected pivoted position for monitoring prices of a selected stock to determine one of: (a) when to buy or retain and (b) when to sell or retain said selected stock, said lever means removably and pivotally mounted on said base along said first scale at a selected position corresponding to a selected price for said stock, said lever means including pointer means for pointing to an actual price for said stock on said second scale, said lever means being pivoted by an external force about said selected position in accordance with changes in said actual price for said stock, and a channel extending along said lever means; and
    ball means movable in said channel between a first position and second position in correspondence with the pivoted position of said lever means for indicating one of: (a) when to buy or retain and (b) when to sell or retain said stock in dependence upon the position of said ball means and upon the relationship between said selected price for said stock on said first scale corresponding to said selected position of said lever means and said actual price for said stock on said second scale pointed to by said pointer means.

2. Apparatus according to claim 1; further including retaining means for releasably retaining said lever means in a selected pivoted position.

3. Apparatus according to claim 2; wherein said retaining means includes spring means for releasably retaining said lever means in said selected pivoted position, said spring means being secured to said base and removably biased into contact with said lever means.

4. Apparatus according to claim 3; wherein said spring means includes a coil spring secured to said base and stretched over said lever means.

5. Apparatus according to claim 3; wherein said retaining means includes a wire rod secured to said base, and biasing means for biasing said wire rod into contact with said lever means.

6. Apparatus according to claim 5; wherein said biasing means includes at least one pin secured to said base and around which said wire rod extends for biasing said wire rod into contact with said lever means.

7. Stock price tracking apparatus, comprising:
    a base having a cube configuration with four sides;
    a first scale on each side of said base;
    a second scale on each side of said base;
    lever means mounted on each side of said base and releaseably retainable in a selected position for monitoring prices of a selected stock to determine one of: (a) when to buy or retain and (b) when to sell or retain said selected stock, each said lever means removably and pivotally mounted on a side of said base along said first scale at a selected position corresponding to a selected price for said stock, each said lever means including pointer means for pointing to an actual price for said stock on said second scale, said lever means being pivoted by an external force about said selected position in accordance with changes in said actual price for said stock, and a channel extending along said lever means; and
    ball means associated with each lever means and movable in the respective channel between a first position and a second position in correspondence with the pivoted position of said lever means for indicating one of: (a) when to buy or retain and (b) when to sell or retain said stock in dependence upon the position of said ball means and upon the relationship between said selected price for said stock on said first scale corresponding to said selected position of said lever means and said actual price for said stock on said second scale pointed to by said pointer means.

8. Apparatus according to claim 7; further including support means for supporting a plurality of said bases having said cube configuration, said support means including a support platform and an upstanding support shaft secured to said support platform; and wherein each base having said cube configuration has a top, a bottom, and a first aperture in said top and a second aperture in said bottom through which said support shaft extends, wherein a plurality of said bases can be rotatably supported on said support shaft.

9. Stock price tracking apparatus, comprising:
    a base in the form of a stand having opposite sides;
    a first scale on each side of said base;
    a second scale on each side of said base;
    lever means mounted on each side of said base and releaseably retainable in a selected position for monitoring prices of a selected stock to determine one of: (a) when to buy or retain and (b) when to sell or retain said selected stock, said lever means removably and pivotally mounted on each side of said base along said first scale at a selected position corresponding to a selected price for said stock, said lever means including pointer means for pointing to an actual price for said stock on said second scale, said lever means being pivoted by an external force about said selected position in accordance with changes in said actual price for said stock, and a channel extending along said lever means; and ball means associated with each lever and movable in the respective channel between a first position and a second position in correspondence with the pivoted position of said lever means for indicating one of: (a) when to buy or retain and (b) when to sell or retain said stock in dependence upon the position of said ball means and upon the relationship between said selected price for said stock on said first scale corresponding to said selected position of said lever means and said actual price for said stock said on said second scale pointed to by said pointer means.

10. Stock price tracking apparatus, comprising:

a plurality of bases mounted on a common wall, each base in the form of a display having a side;

a first scale on each said base;

a second scale on each said base;

lever means mounted on said side of each base and releaseably retainable in a selected position for monitoring prices of a selected stock to determine one of: (a) when to buy or retain and (b) when to sell or retain said selected stock, each said lever means removably and pivotally mounted on said base along said first scale at a selected position corresponding to a selected price for said stock, each said lever means including pointer means for pointing to an actual price for said stock on said second scale, said lever means being pivoted by an external force about said selected position in accordance with changes in said actual price for said stock, and a channel extending along said lever means; and ball means associated with each lever means and movable in said channel between a first position and a second position in correspondence with the pivoted position of said lever means for indicating one of: (a) when to buy or retain and (b) when to sell or retain said stock in dependence upon the position of said ball means and upon the relationship between said selected price for said stock on said first scale corresponding to said selected position of said lever means and said actual price for said stock on said second scale pointed to by said pointer means.

11. Apparatus according to claim 1; wherein said pointer means includes screw means screw threadedly received within said lever means for pointing to said actual price for said stock on said second scale as said lever means is pivoted on said base about said selected position.

12. Apparatus according to claim 1; wherein said pointer means is fixedly secured to said lever means.

13. Apparatus according to claim 1; wherein said lever means includes pocket means for retaining said ball means at one end of said channel when said lever means is moved to a certain pivoted position.

14. Apparatus according to claim 13; wherein said lever means includes alarm means for indicating when said ball means is positioned within said pocket means.

15. Apparatus according to claim 13; wherein said lever means includes a through bore in communication with said pocket means and through which a pin can be inserted for removing said ball means from said pocket means.

16. Apparatus according to claim 1; wherein said lever means includes gripping means for moving said lever means to different selected pivoted positions.

17. Apparatus according to claim 16; wherein said gripping means has a width less than the width of the remainder of said lever means.

18. Apparatus according to claim 16; further including retaining means in contact with said gripping means for releasably retaining said lever means at a position to which said lever means has been pivoted.

19. Apparatus according to claim 1; wherein said lever means includes lever extension means pivotally mounted on said base along said first scale at the same selected position that said lever means is pivoted about and pivotally mounted with respect to said lever means, and fastening means for securing said lever extension means and said lever means together at a desired position to which each has been pivoted relative to the other.

20. Apparatus according to claim 19; wherein each of said lever means and said lever extension means includes an elongated slot, and said fastening means includes bolt means extending through said slots for securing said lever means and said lever extension means together at a desired position to which each has been pivoted relative to the other.

21. Apparatus according to claim 1; wherein said first stock price corresponds to a stop loss setting, and said ball means is movable in said channel between said first position when said actual price for said stock is above said stop loss setting and said second position when said actual price for said stock is not greater than said stop loss setting.

22. Apparatus according to claim 1; further including a chart removably secured to said base, said chart including said first and second scales.

* * * * *